Sept. 18, 1934.   F. KRUCKENBERG ET AL   1,973,816
VEHICLE ROLLER MOUNTING
Filed Sept. 4, 1930   3 Sheets-Sheet 1

Sept. 18, 1934.  F. KRUCKENBERG ET AL  1,973,816
VEHICLE ROLLER MOUNTING
Filed Sept. 4, 1930    3 Sheets-Sheet 2
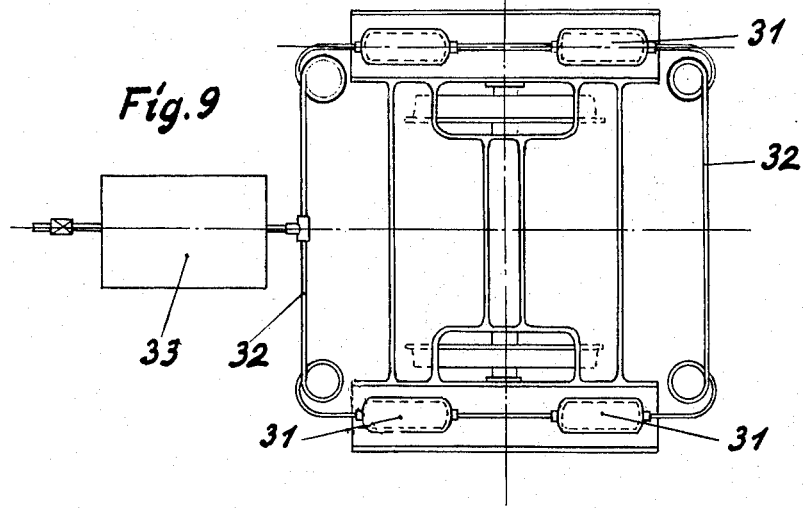
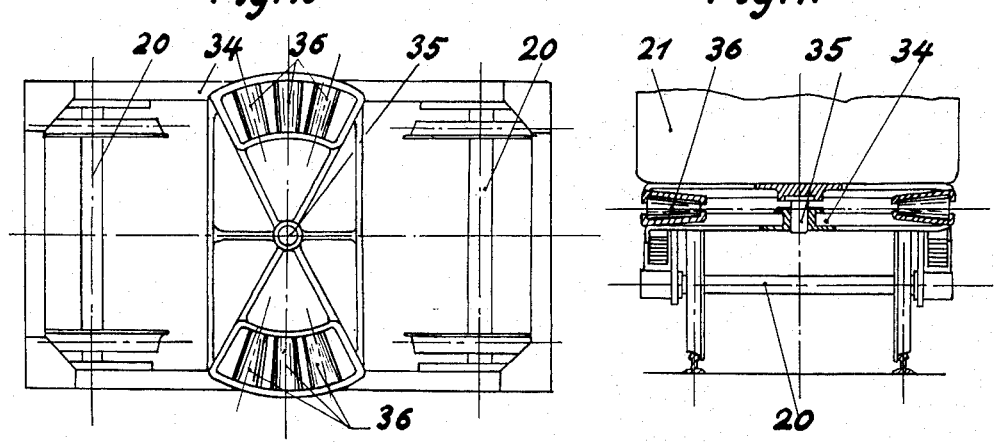
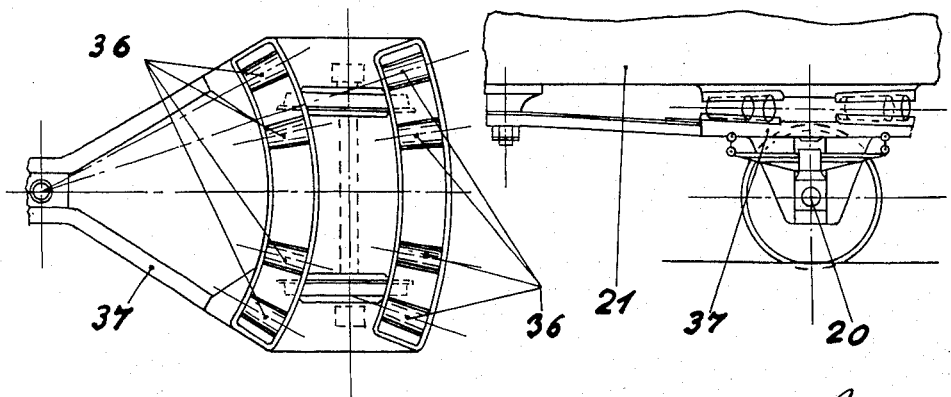

Sept. 18, 1934.  F. KRUCKENBERG ET AL  1,973,816
VEHICLE ROLLER MOUNTING
Filed Sept. 4, 1930  3 Sheets-Sheet 3
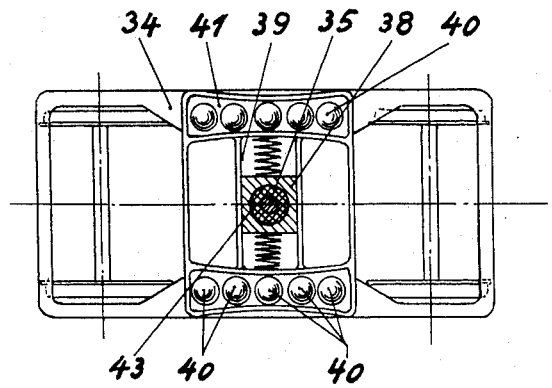
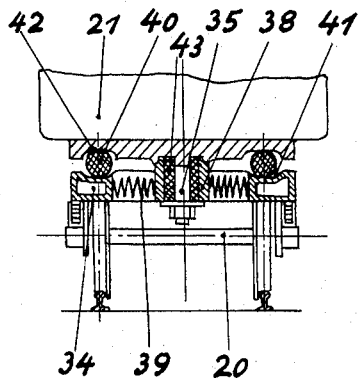
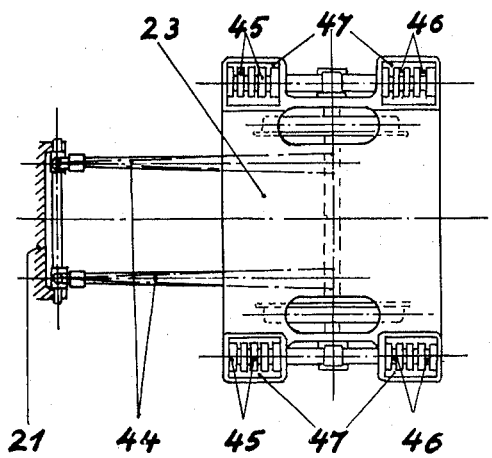
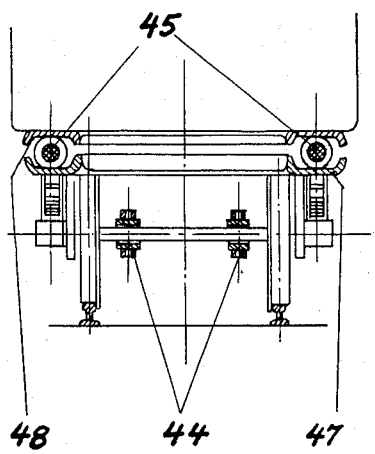
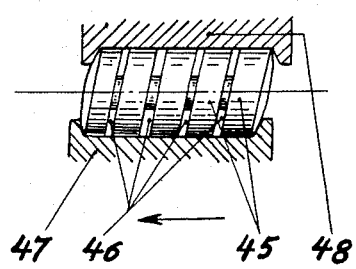
Inventors:
Franz Kruckenberg,
Curt Stedefeld,
by Byrnes, Townsend & Potter,
Attorneys.

Patented Sept. 18, 1934

1,973,816

UNITED STATES PATENT OFFICE 1,973,816

VEHICLE ROLLER MOUNTING

Franz Kruckenberg and Curt Stedefeld, Hanover, Germany

Application September 4, 1930, Serial No. 479,761
In Germany September 7, 1929

11 Claims. (Cl. 308—224)

Most vehicles have in their chassis a spring arrangement which deals exclusively or principally with vertical shocks between the wheels and track. They are comparatively rarely arranged to deal with horizontal shocks in the running direction or across it or of a rotational nature, although in guided vehicles, accordingly in railways in particular, such shocks may be very considerable. Usually suspending the vehicle body on the ends of the laminated springs by short pendulum members which allow limited movement of the body with respect to the chassis, is allowed to suffice. But the forces returning the body to the mid-position and the limiting stops usually act with undesirable hardness, even in express train cars with bogie trucks which have special cradles on long pendulum bars for cross movements. If horizontally acting springs are used for the return movement, while the body rests on sliding surfaces on the truck frame, some improvement can be obtained. But in all these arrangements the rumbling, clattering and vibration are undesirably transmitted from the truck to the body even though the large shocks may be softened by springs or pendulum bars. Rubber intermediate plates which reduce the former effects are therefore often used in the iron construction of the floor of the vehicle.

The present invention overcomes all these disabilities by the vehicle body being supported on the trucks by rolling surfaces of rubber or similar soft elastic material, thus being easily and smoothly movable up to the limits of motion, with similar effective vibration and shock damping as in a roller tired motor vehicle running on the street.

Figure 1:
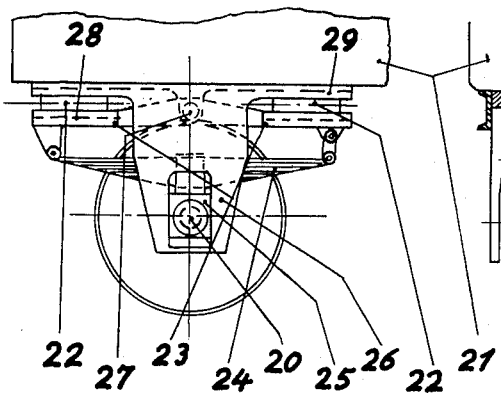
Figure 2:
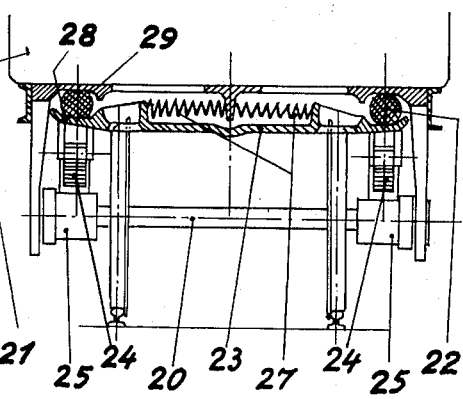
Figure 3:
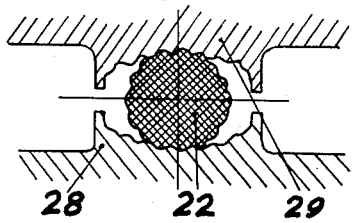
Figure 7:
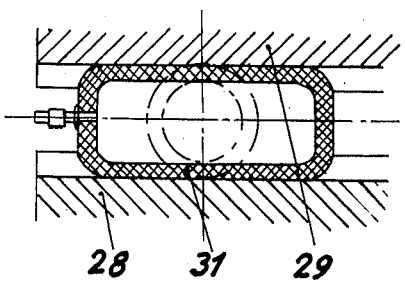
Figure 8:
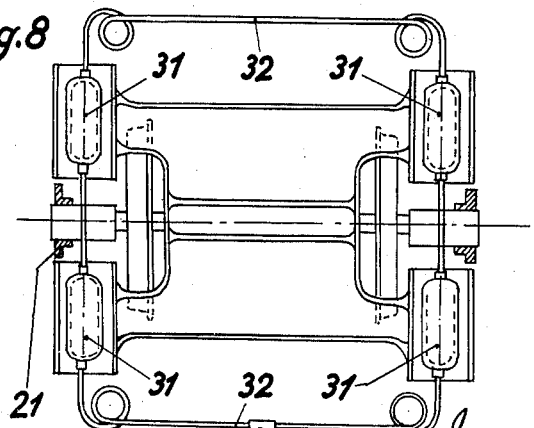

Fig. 1 is a side elevation of a portion of a vehicle showing an application of the invention, Fig. 2 is an end elevation of Fig. 1, Figs. 3, 4, 5, 6 and 7 are sectional views of various modifications of side bearings, Figs. 8 and 9 show methods of connecting the hollow side bearings of Fig. 7, by hollow tubes, Figs. 10 and 11 are plan and end elevations respectively, of an application of a modification of the invention, Figs. 12 and 13 are plan and side elevations respectively, of an application of a modification of the invention, Figs. 14 and 15 are plan and side elevations respectively, of an application of a modification of the invention, Figs. 16 and 17 are plan and side elevations respectively, of an application of a modification of the invention, and Fig. 18 is an enlarged view of the bearing used in Figs. 16 and 17.

The application of the invention to several different types of railway vehicle is illustrated in the accompanying drawings. Figures 1 and 2 show in side and end view, a laterally movable single axle 20 below the body 21. The latter is supported by means of rubber rollers 22 on a chassis frame 23 which itself rests on the axle boxes 25 of the axle 20 by means of the usual vertical action springs 24. The axle boxes 25 are guided in forks 26 on the body 21, but they can move freely sideways therein under lateral shocks. The body 21 then rolls on the rubber rollers 22. The latter can here be simple cylinders. The return forces for centering can be provided by horizontally pre-loaded springs 27 in known manner. Limiting of the movement can be effected equally smoothly against the rubber roller by carrying up the ends of the roller paths 28 and 29. See Figure 2.

Figure 4:
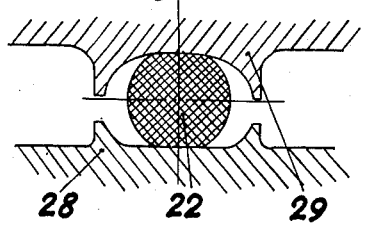
Figure 5:
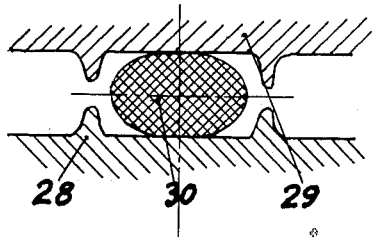
Figure 6:
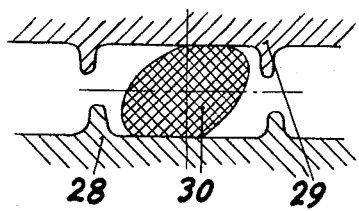

The return forces can be exerted through the rollers 22 themselves without using special springs 27, by curving the rolling paths 28 and 29 upwards and downwards respectively from the mid position. This arrangement is illustrated on an enlarged scale in Figure 3 (end view similar to Figure 2). In this way the return forces can be made to follow any desired law, they can increase proportionately to the lateral displacement in accordance with a straight line law, as with the springs 27, or they may increase more slowly at first and more rapidly with larger displacements, as with the inclined pendulum rods of the bogies of express trains. Naturally as shown in Figure 4 one rolling surface 28 can be flat and only the other 29 curved. Furthermore, flat rolling surfaces 28 and 29 can yield return forces if as shown in Figure 5 (mid position) and Figure 6 (laterally displaced position) the roller 30 is not of circular but of elliptical section. Naturally other forms intermediate between those shown and described or combined forms are possible.

It is important that in all these bearings the roller 22 should not slide laterally on the paths 28 and 29 as otherwise it would be in the wrong place at the positions of extreme displacement. For this purpose the roller can be provided with grooves, teeth or projections which remain in positive mesh with a corresponding formation of the rolling paths. This is shown for example in Figure 3. Roller cages of the kind used in roller bearings could also serve for this purpose.

It is not necessary that the rollers should be of soft elastic material; the rollers could equally well be hard say of steel and the rolling paths 28 and 29 therefor be of soft elastic material say rubber. Finally, both rollers and paths could be of soft elastic material.

Another mode of embodiment of the invention is shown in Figure 7; here the rolling member is a hollow body 31 which can be filled with compressed air, pneumatic tire fashion. The tracks 28, 29 on which the hollow body rolls are preferably curved, as above described, to provide return forces for centering the rolling bodies 31 when the displacement force is removed. If with this form it is desired to maintain the pressure in all the rolling bodies automatically the same and where possible variable during operation, they can be connected together by flexible pipes 32 (hosepipes) and connected to a compressed air line, see Figure 8, which corresponds to Figures 1 and 2. The movement of the rolling bodies is so small that the bending of the pipes 32 remains within permissible limits. It may also be advantageous to make the working volume of the compressed air greater than the interior volumes of the rolling bodies; for this purpose a fixed built in auxiliary chamber 33 to which the rolling bodies 31 are connected by flexible pipes 32, may be used. An obvious alternative is for one or both of the rolling paths to be made hollow and filled with compressed air, when the rollers themselves might be solid.

The form of the rollers will vary according to the chassis arrangement.

In Figures 10 and 11 a bogie truck 34 is shown in plan and elevation, which only makes rotational movement about the vertical pin 35, with respect to the car body, while lateral motion of the running axles 20 is limited by pendulum suspension of the springs on the bogie frame 34. The rollers 36 are here preferably of conical form co-acting with a conical path, with large surfaces and therefore with low intensity of pressure. If the vehicle is light, the rolling system can naturally be constructed, like a ball thrust bearing, of balls running in circular grooves. Balls as rolling bodies in this case render possible the use of a bearing for the pin 35 yieldable in all directions supported in a rubber or pneumatic buffer arrangement, so that all connections between the car body and the bogie are damped by soft elastic material. See Figures 14 and 15.

With a pony truck 37 such as shown in Figures 12 (plan) and 13 (elevation) rollers 36 of conical form are correct.

Balls as rolling bodies are advantageous in all cases where the rolling body moves not in a linear path, but where owing to a particular arrangement several directions of motion are possible. An example of this is the bogie truck 34 shown in Figures 14 (plan) and 15 (elevation), with a laterally movable pivot pin 35 which for this purpose is carried by a block 38 linearly guided across the truck. Since the block 38 can effect rotational movements with respect to the vehicle body 21 about the pin 35 as well as straight line cross movements in its guide 39, the rolling body paths extend over a surface. In order to obtain slip free engagement of the balls 40 with the surfaces 41 and 42 they must have not linear grooves, but crossed toothing or separate excrescences or depressions. The pin 35 is here raised in a bearing which is yieldably supported in all directions by a rubber cushion 43. In this way provision is made throughout, both by the supporting rolling bodies and in the mounting of the pin bearing of the car body that the unavoidable rumbling, clattering and vibration cannot reach the vehicle body from the bogie truck. The movements of the pin 35 out of mid position which take place on the occurrence of shocks owing to the resilience of the cushion 43 are unobjectionable, as regards the supporting balls 40, since the latter can roll in any direction.

Cases also occur with rolling motion possible in several directions, in which cylinders or cones can be used, if distortion of the soft elastic material (rubber) is brought into play. An example is provided by Figures 16 and 17 (plan and elevation) which show a truck 23 with parallel links 44 which enable the axle 20 to move laterally without its taking an inclined, radial position, as suffices for example in cars of short wheel base running on tracks with few curves. Apart from the purely lateral movement, the rolling bodies here have to yield to small movement in the longitudinal direction, arising from the angular path of the links. The rollers 45 are therefore made in the form of cylinders with deep grooves 46 which in effect divide the cylinder into a series of flat discs only connected together with a weak shaft. In this way as shown in Figure 18, the rolling surface 47 can move longitudinally slightly with respect to the surface 48 without the soft elastic material of the rollers being excessively stressed. If necessary the subdivision of the roller can be carried further by means of crossed grooves.

As well as rubber, artificial resin and thickened oil can be used as the soft elastic material. The last mentioned has given good results in vibration and noise damping plates, the former particularly in pressed pieces with fabric inlays is used for noiseless toothed gears and other articles. Such inlays of cord fabric and so forth, as in pneumatic tires, are also useful for limiting locally dangerous deformations by means of inlays which while flexible are practically inextensible. Since the rollers in general do not make a full revolution and during most of their operating time remain loaded in mid position, over stressing is avoided and proper maintenance of form is best effected by arranging the inlays, or at least the strongest inlays, around the equator of the roller, girdle fashion, the regions where pressure is applied above and below in the mid position of the car being the poles. It is at the equator where under the permanent crushing load, the great tensile strains of the roller occur, and need to be provided for by the inlays. Steel wires or ropes can also be used as inlays.

Finally it may also be mentioned that hollow rollers not air filled, but similar to cushion tires, and rollers and rolling surfaces with a hard core and a soft elastic covering can also be used in carrying out the invention.

We claim:

1. In a vehicle, the combination with a vehicle body, a supporting chassis, and means connecting said body and chassis for relative lateral and vertical movement, of elastic means for transmitting the vehicle load to the chassis, said elastic means including path means on said body and chassis providing rolling paths, and load-transmitting means in the form of a plurality of roller elements between said rolling paths, at least one of the cooperating surfaces provided by said path means and load-transmitting means being soft elastic surfaces deformable under the load impressed thereon, and at least one of the means constituting said path means and load-transmitting means being shaped to present an increasing resistance to relative lateral displacement of said body and chassis as said body moves from its normal midposition on said chassis.

2. The invention as claimed in claim 1, wherein said path means is shaped to present an increasing resistance to relative displacement of the body and chassis as said body moves from its normal midposition on said chassis.

3. The invention as claimed in claim 1, wherein the roller elements of said load transmitting means are shaped to present an increasing resistance to relative displacement of the body and chassis as said body moves from its normal midposition on said chassis.

4. The invention as set forth in claim 1, wherein said path means comprise rigid members, and said load-transmitting means are soft elastic rollers.

5. Side bearings for a vehicle comprising rolling paths on said body, rolling paths on the chassis of the vehicle, hollow rollers of elastic material between said paths, and flexible pipes interconnecting said rollers.

6. Side bearings for a vehicle comprising rolling paths on said body, rolling paths on the chassis of the vehicle, hollow rollers of elastic material between said paths, a stationary auxiliary container for compressed air, and flexible pipes interconnecting said rollers and said container.

7. In a vehicle, the combination with a vehicle body, a chassis, and means connecting said body and chassis to permit relative horizontal movement thereof in a direction normal to the longitudinal axis of the body, and cooperating roller paths on said body and chassis, said paths extending respectively along each longitudinal edge of said chassis and the adjacent portions of said body, of soft elastic rollers between said paths for transmitting the load from said body to said chassis, said rollers being arranged for rolling movement about the axes thereof parallel to the longitudinal axis of the body and being axially deformable to permit that longitudinal movement of said body and chassis which is incidental to the lateral movement thereof.

8. The invention as set forth in claim 7, wherein said connecting means includes means pivotally connecting said body and chassis.

9. The invention as set forth in claim 7, wherein said rollers comprise a plurality of spaced rollers in each of said paths.

10. The invention as set forth in claim 7, wherein said rollers comprise a plurality of spaced cylindrical members in each of said paths, the axes of said members being normally parallel to the longitudinal axis of the vehicle body.

11. The invention as set forth in claim 7, wherein said rollers comprise a plurality of spaced balls in each of said paths.

FRANZ KRUCKENBERG.
CURT STEDEFELD.